Figure 1:
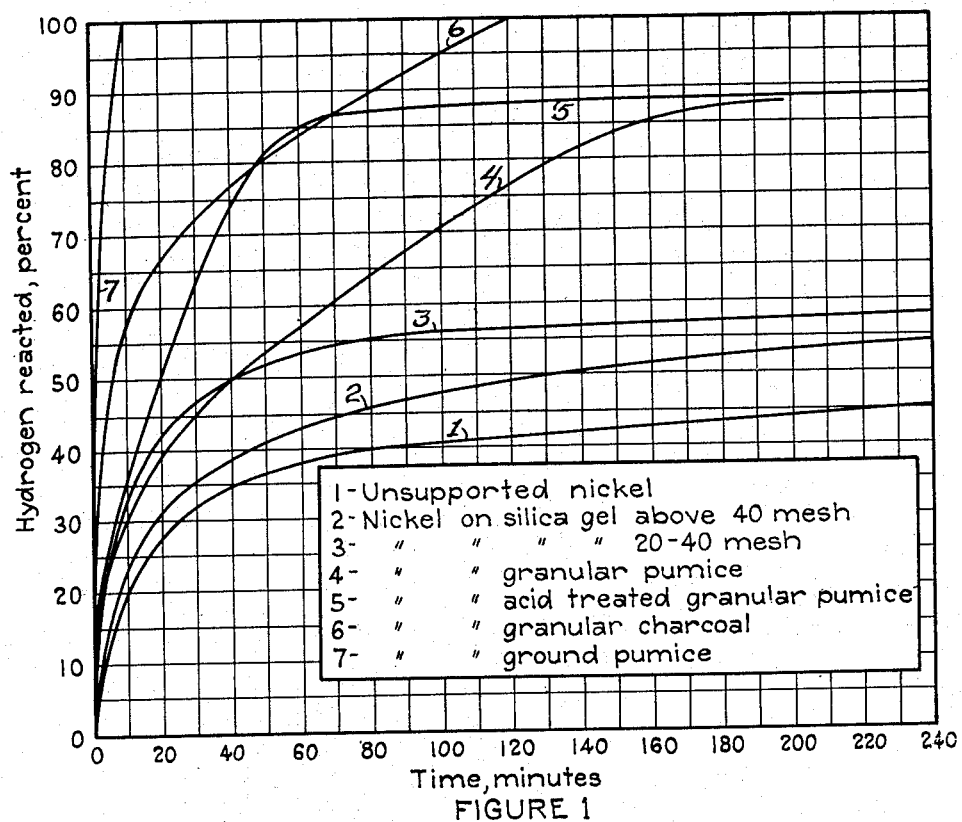

Dec. 7, 1937.   H. M. SMITH ET AL   2,101,104
CATALYST FOR HYDROGENATING HYDROCARBONS
Filed April 26, 1934   2 Sheets-Sheet 2

INVENTORS

Patented Dec. 7, 1937

2,101,104

UNITED STATES PATENT OFFICE 2,101,104

CATALYST FOR HYDROGENATING HYDROCARBONS

Harold M. Smith and Harry T. Rall, Bartlesville, Okla.

Application April 26, 1934, Serial No. 722,518

11 Claims. (Cl. 260—168)

(Granted under the Act of March 3, 1883, as amended April 30, 1928; 370 O. G. 757)

This invention described herein may be manufactured and used by or for the Government for governmental purposes, without the payment to us of any royalty thereon.

This invention relates to the pyrolytic synthesis of light oil from natural gas, such as we have described and claimed in our pending applications serially numbered 629,734 and 640,508, and entitled respectively Process of treating hydrocarbons and Process for treating gaseous hydrocarbons; more especially it is directed to the catalysts and their operating conditions in the catalytic hydrogenation stage of the methods constituting the subject matters of the applications specified.

In their efforts to devise and improve processes for the conversion of natural gas or its components to commercially valuable substances such as anti-knock motor fuels and solvents, research workers have been handicapped in attaining their objective by the concurrent formation of considerable quantities of tarry material whenever maximum yields of useful products have been approached. It has been our observation that a considerable portion of these tars are composed of an aromatic substance, naphthalene, which, while of no great economic worth in itself, can be converted into a more valuable derivative—the liquid, tetrahydronaphthalene. However, in order to successfully convert this naphthalene to the hydrogenated compound it is necessary to first remove the heavier portions of the tar, which would foul the catalyst essential for the hydrogenation of naphthalene. The application filed January 25, 1934, Serial No. 708,288 on the use of electrical precipitation covers this feature of the process. The other necessary feature of the process is an efficient catalyst, and this application is concerned with the composition and operating conditions of certain hydrogenating catalysts.

The use of hydrogenating catalysts for the conversion of naphthalene to its tetra derivative is not new, and neither are most, if any, of the catalysts which this invention discloses. However, to the best of our knowledge the manner in which we propose to use these catalysts and the operating conditions which our experiments have shown to be necessary are new and different. While investigating catalysts for the hydrogenation of naphthalene produced by pyrolytic decompositions of gaseous hydrocarbons wherein the hydrogen utilized for the purpose of hydrogenation is produced simultaneously with the production of the aromatic hydrocarbons we have discovered that certain metals are more effective catalysts than others, that the effectiveness is dependent upon the concentration of the metal upon the carrier or the manner in which the metal is produced, and upon the composition of the carrier.

One of the fundamental objects of this invention is the production of a catalyst of the proper composition and construction to cause the specific hydrogenation desired. We have also discovered that the effectiveness of the catalyst is greatly influenced by changes in operating conditions, especially changes in temperature and pressure.

Another important object of this invention therefore resides in the provision of a method for applying these catalysts to the specific hydrogenation concerned.

Briefly stated, this invention consists in producing metallic catalysts, either supported or unsupported, of such definite compositions, concentrations and structures that the desired hydrogenation will be accomplished when carried out under the temperature and pressure conditions which have been found most applicable, using as a hydrogenating agent the hydrogen produced simultaneously with the aromatic hydrocarbons.

In general the invention will be applied to the tars produced by the thermal decomposition of hydrocarbon gases. In such a process the gases are first cracked and passed through an electrical precipitating chamber where certain portions of the tar are removed, and then allowed to pass into a hydrogenation chamber where they contact with a catalyst under the conditions as indicated in this invention. The material leaving this chamber is then passed to a recovery system where the liquid products are extracted.

Coming now to a more detailed account of the catalyst, experiments have shown that the following metals or metal combinations will promote the hydrogenation reaction desired; nickel, cobalt, platinum, palladium, nickel-cobalt, nickel-mercury, nickel-thorium, nickel-molybdenum, nickel-chromium. Of these, platinum, palladium and pure nickel are the most effective, with cobalt containing a trace of nickel practically as active as pure nickel.

The physical form of the catalyst has been shown to be of importance in regard to the activity of the catalyst. Thus by experiment we have found that unsupported nickel is not as effective as nickel mounted on a support, comparing equal weights of metal.

Further we have found that the nature of the support exerts profound influence upon the activity of the catalyst. For examples of this, reference will be had to Figure 1. This figure shows curves for catalyst activity in terms of percent of hydrogen reacted based on the total amount that could react, using pure naphthalene as the reactant. Inspection of the curves at the 40 percent point, which would be virtually equivalent to conversion to tetrahydronaphthalene, shows that the catalysts may be arranged in the following order of increasing activity; unsupported nickel, nickel on silica gel above 40 mesh, nickel on untreated granular pumice, nickel on silica gel, 20–40 mesh, nickel on acid treated granular pumice, nickel on granular charcoal, nickel on ground pumice.

Figure 2:
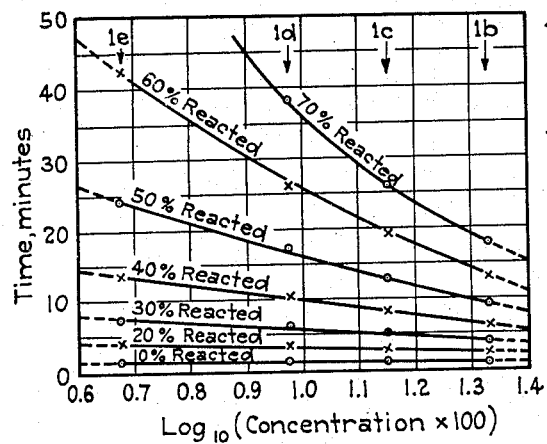

The concentration of metal on the carrier has also been found to exert considerable influence upon the reaction rate. In Figure 2 the relationship between catalyst concentration and reaction time at a temperature of 115° C. and at a constant hydrogen pressure of 60 cm. of mercury is shown. The catalyst used in these experiments is nickel mounted on acid treated granular pumice. It is evident from the graph that at the 40 percent reacted point the reaction time is proportional to the logarithm of the concentration of the metal on the carrier, from a concentration of .05 gram of nickel per gram of pumice to the maximum amount of nickel that the pumice will retain, about 0.25 gram of metal per gram of pumice. Thus we have found that at a definite temperature, pressure and catalyst volume, the hydrogenation of naphthalene to form tetrahydronaphthalene, which is the predominating reaction in our process for the hydrogenation of the tars, proceeds at a rate proportional to the logarithm of the concentration of nickel on the pumice support. In this connection it is to be understood that as the data shown on Figs. 1, 2 and 3 respectively was obtained under static conditions using pure naphthalene and since pyrolytic tar is composed of many substances, only 20–25 percent of which is naphthalene, the data shown by said figures can only be utilized as a guide in the treatment of pyrolytic tars.

Before discussing the influence of temperature and pressure several examples for the preparation of catalysts that have proved to be efficient in promoting the desired hydrogenation reaction will be given.

(1) 20 mesh granular pumice is subjected to the following treatment before impregnation with the nickel: washed with water, heated with 10 per cent sodium hydroxide for two hours, washed with water several times, treated with 3N nitric acid heated to boiling, then thoroughly washed with distilled water, dried, sieved, and heated in the muffle for one hour at red heat. Sufficient nickel nitrate to give a concentration of .25 gram of nickel per gram of pumice is then dissolved in just sufficient water to completely moisten the pumice and the hot solution poured over the warm pumice, which is then dried on the hot plate until partially oxidized. It is then completely oxidized over a suitable burner and finally heated for one hour in a muffle furnace at low red heat. After sieving it is ready for reduction with hydrogen for six hours at 300° C. The catalyst is then ready for use, but must be kept in an atmosphere of hydrogen or inert gas to prevent loss of activity.

(2) Lump pumice is ground in a mortar and mixed intimately with well washed nickel carbonate freshly precipitated from nickel nitrate by ammonium carbonate. Sufficient nickel is used so that the ratio of metal to pumice by weight is 0.25. The paste is pressed into rods and dried at 100° C. and broken into pellets. It is reduced directly without previous oxidation by hydrogen for six hours at 300° C.

(3) Active granular charcoal is impregnated with nickel nitrate dissolved in just sufficient water to moisten the charcoal, using enough nickel to give a ratio of metal to carrier of 0.15 by weight. The moist charcoal is dried and reduced with hydrogen for six hours at 300° C.

It should be understood that we do not limit ourselves to the above catalysts or their method of preparation. Any catalyst containing any of the metals or metal mixtures mentioned previously and conforming in composition and concentration of metal to our discoveries, when applied to the hydrogenation of pyrolytically produced naphthalene by our process, will be considered within the scope of this invention.

Our experiments with nickel catalysts as applied to the hydrogenation of naphthalene and therefore to that portion of pyrolytic tars containing naphthalene, have shown that the reaction rate is increased by increase in operating temperature. For example, in the case of a catalyst containing 0.25 gram of nickel per gram of acid treated pumice, it has been found that at constant pressure the reaction rate at the 40 per cent reacted point is tripled when the temperature is raised from 95° C. to 135° C. It is apparent then that increased temperatures accelerate the desired hydrogenation reaction.

Figure 3:
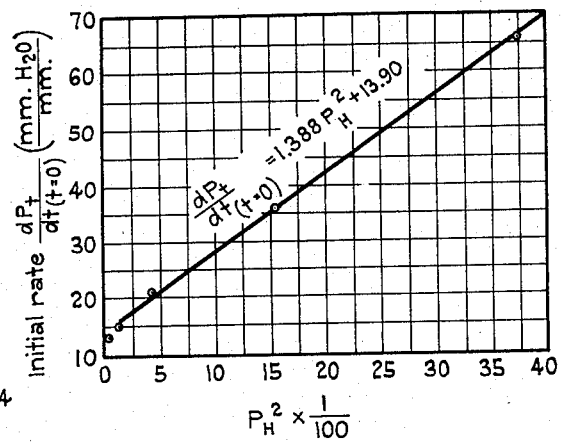

Experiments on the hydrogenation of naphthalene under several different pressures have shown that pressure has a great effect on the rate of the reaction. Figure 3 shows the relationship between the initial rate of reaction and the square of the initial hydrogen pressure. This relationship is practically linear over the pressures studied, and may be expressed by the following equation for hydrogenations with a 0.25 nickel catalyst at 115° C.:

$$\frac{dP_t}{dT_t} = 1.388 P_H{}^2 \pm 13.90$$

This equation is valid for hydrogen partial pressures from 10 to 76 centimeters of mercury, where $P_H$ is expressed in centimeters of mercury.

Figure 4:
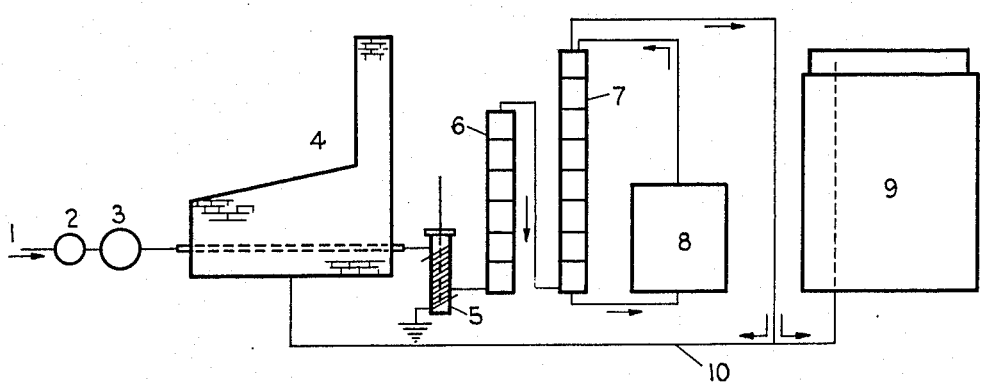
Figure 5:
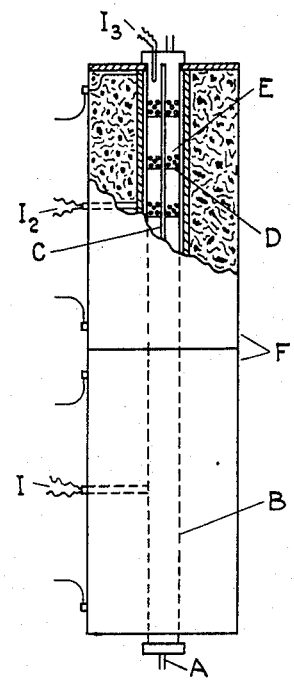

In order to show the application of the catalyst to the hydrogenation of naphthalene in cracked natural gas, reference should be made to Figures 4 and 5. In Figure 4 is shown a diagrammatic set-up of the apparatus successfully employed in the process in which this hydrogenation is carried out. The gas to be cracked enters the system at 1, passes through the pressure regulator 2 and meter 3 into the cracking furnace 4. After having been maintained at an appropriate temperature for a definite time the gases pass into the electrical precipitator 5. Here the undesirable portions of the tar are separated by precipitation on the walls of the precipitator, which is maintained at a definite temperature, as fully described in our pending application Serial No. 708,288. The cleaned gases and naphthalene vapors pass on into the catalyst chamber 6 (shown in more detail in Figure 5). The gases and vapors coming from the hydrogenation tower (7) next enter an absorption tower where the liquid products are absorbed and later extracted in the recovery unit 8. The uncondensed gases may be sent to the fuel line 10 or stored in the gasometer 9.

Referring now to Figure 5, which shows partly in elevation and partly in vertical transverse section the details of a laboratory hydrogenation chamber, the gas from the precipitator enters this chamber at the bottom at A, and passes up through a central tube B. This tube contains an axial rod C upon which nichrome gauze disks D are equally spaced. These gauze disks act as trays to hold the catalyst E, which may be any of the catalysts we have previously described. The incoming gas and naphthalene vapors pass upward over and around this catalyst, and the naphthalene is converted to tetrahydronaphthalene by the action of the catalysts and the hydrogen in the gas. It is necessary to maintain the catalyst at a definite temperature, and this is accomplished by means of heaters F. The temperatures are determined by thermocouples $I_1$, $I_2$, $I_3$.

The following data will serve as an example of a successful run with this type of apparatus. Gas containing 64.79 percent methane, 3.71 percent ethane, 1.89 percent propane, .98 percent butane, .39 percent pentane plus, and the balance nitrogen was cracked at 880° C. and 75 pounds gauge pressure with a contact time of 4.5 seconds. This gave a cracked gas containing about 12 percent hydrogen, corresponding to a hydrogen pressure of about 56 centimeters of mercury. This cracked gas carried with it the vapors of about 416 grams of tar and 650 grams of light oil per 1000 cubic feet of inlet gas. The gas and vapors next entered the precipitator chamber which was maintained at 100° C. with a potential difference across the electrodes of about 14,000 volts. Here about 300 grams of tar per 1000 cubic feet were removed and the remainder of the tar, now largely naphthalene, entered the hydrogenating chamber together with the gas. This chamber was filled with a catalyst made of acid treated pumice impregnated with nickel at a concentration of about 0.25 gram of nickel per gram of pumice. The chamber was maintained at 200° C. The gases and vapors, after passing over this catalyst still contained the same amount of light oil, but in addition there was present tetrahydronaphthalene to the extent of about 110 grams per 1000 cubic feet of inlet gas. These figures show that approximately 26 percent of the tar was passed through the precipitator as naphthalene and then hydrogenated in the catalyst tower to form the liquid derivative tetrahydronaphthalene.

Having described our invention, what we claim as new and wish to secure by Letters Patent is:

1. A method for effecting controlled hydrogenation in a continuous flow process wherein hydrogen evolved concurrently with a mixture of hydrocarbons, containing a polynuclear aromatic is caused to react with and to effect a controlled saturation of the aromatic and which consists in contacting the reactants with a hydrogenating catalyst for a time interval, which at a constant hydrogen pressure within the pressure range of 10 to 60 cm. of mercury and at a temperature within the temperature range of 95° to 200° C. is determined as being a function of the concentration of the catalyst for the amount of reaction desired.

2. A method for effecting controlled hydrogenation in a continuous flow process wherein hydrogen evolved concurrently with a mixture of hydrocarbons containing a polynuclear aromatic is caused to react with and to effect a controlled saturation of the aromatic and which consists in contacting the reactants with a hydrogenating catalyst and its support for a time interval which at a constant hydrogen pressure within the pressure range of 10 to 60 cm. of mercury and at a temperature within the temperature range of 95° to 200° C. is directly proportional to the logarithm of the concentration of the catalyst on its support for the amount of reaction desired.

3. A method including the steps of claim 2 wherein a palladium catalyst is employed.

4. A method including the steps of claim 2 wherein a nickel-cobalt catalyst is employed.

5. A method including the steps of claim 2 wherein a nickel-mercury catalyst is employed.

6. A method including the steps of claim 2 wherein a nickel-molybdenum catalyst is employed.

7. A method including the steps of claim 2 wherein a platinum catalyst is employed.

8. A method for effecting controlled hydrogenation in a continuous flow process wherein hydrogen evolved concurrently with a mixture of hydrocarbons containing a polynuclear aromatic is caused to react with and effect a controlled saturation of the aromatic and which consists in contacting the reactants with a nickel on pumice hydrogenating catalyst for a time interval, which under a constant hydrogen pressure within the pressure range of 10 to 60 cm. of mercury and at a temperature within the temperature range of 95° to 200° C. is directly proportional to the logarithm of the concentration of the nickel on its support for the amount of reaction desired.

9. A method for effecting controlled hydrogenation in a continuous flow process wherein hydrogen evolved concurrently with a mixture of hydrocarbons containing a polynuclear aromatic is caused to react with and effect a controlled saturation of the aromatic and which consists in contacting the reactants with a nickel on charcoal hydrogenating catalyst for a time interval, which under a constant hydrogen pressure within the pressure range of 10 to 60 cm. of mercury and at a temperature within the temperature range of 95° to 200° C. is directly proportional to the logarithm of the concentration of the nickel on the charcoal for the amount of reaction desired.

10. A method for effecting controlled hydrogenation of a mixture of hydrocarbons containing aromatics for a controlled amount of saturation of the polynuclear aromatics, which consists in contacting the reactants with a hydrogenating catalyst at a reaction temperature within the range of 95° to 200° C., for a time interval which is determined as being a function of the concentration of the catalyst on its support at a certain partial pressure of hydrogen for the amount of reaction desired and with the partial pressure of the hydrogen being determined as a function of the rate of reaction for the amount of reaction desired.

11. A method for effecting controlled hydrogenation in a continuous flow process wherein hydrogen evolved concurrently with a mixture of hydrocarbons containing a polynuclear aromatic is caused to react with an effect the controlled saturation of the aromatic, which consists in contacting the reactants with a hydrogenating catalyst on a support for a time interval within a temperature range of 95° to 200° C., which is a function of the pressure, temperature and concentration of the catalyst on its support for the amount of reaction desired.

HAROLD M. SMITH.
HARRY T. RALL.